United States Patent
Schaefer et al.

(10) Patent No.: US 12,411,823 B2
(45) Date of Patent: Sep. 9, 2025

(54) COMPUTER-IMPLEMENTED DATA PROCESSING METHOD, AND MEASUREMENT SYSTEM

(71) Applicant: Rohde & Schwarz GmbH & Co. KG, Munich (DE)

(72) Inventors: Andrew Schaefer, Munich (DE); Victor Arroyo, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 18/436,824

(22) Filed: Feb. 8, 2024

(65) Prior Publication Data

US 2024/0311351 A1    Sep. 19, 2024

(30) Foreign Application Priority Data

Mar. 15, 2023    (EP) .................................... 23162065

(51) Int. Cl.
*G06F 16/215* (2019.01)
*G06F 16/22* (2019.01)
(Continued)

(52) U.S. Cl.
CPC ........ *G06F 16/215* (2019.01); *G06F 16/2264* (2019.01); *G06F 16/26* (2019.01); *G06F 16/278* (2019.01)

(58) Field of Classification Search
CPC ...... G06F 16/215; G06F 16/26; G06F 16/278; G06F 16/2264
See application file for complete search history.

(56) References Cited

U.S. PATENT DOCUMENTS

| | | |
|---|---|---|
| 11,443,194 B2 | 9/2022 | Andoni et al. |
| 2008/0071843 A1 | 3/2008 | Papadimitriou et al. |
| | (Continued) | |

FOREIGN PATENT DOCUMENTS

CN    108073695 A    5/2018

OTHER PUBLICATIONS

Ghodsi, Ali, "Dimenionality Reduction A Short Tutorial," University of Waterloo, Waterloo, Ontario, Canada, 2006, pp. 1-25.
(Continued)

*Primary Examiner* — William P Bartlett
(74) *Attorney, Agent, or Firm* — CHRISTENSEN O'CONNOR JOHNSON KINDNESS PLLC (57) ABSTRACT

A computer-implemented data processing method includes the steps of: capturing and/or receiving a data set, wherein the data set includes a plurality of data points; reducing a dimensionality of the data set, thereby obtaining an adapted data set having a reduced dimensionality, wherein the adapted data set includes adapted data points, wherein the adapted data points have a predetermined number of latent coordinates, respectively, and wherein the latent coordinates are associated with a latent space; partitioning the latent space into a plurality of latent subspaces; determining at least one representative parameter for the plurality of latent subspaces, respectively, wherein the at least one representative parameter includes additional information on the adapted data points located in the respective latent subspace; and generating joint visualization data based on the adapted data set and based on the representative parameters determined. Further, a measurement system is described.

15 Claims, 5 Drawing Sheets

(51) Int. Cl.
*G06F 16/26* (2019.01)
*G06F 16/27* (2019.01)

(56) References Cited

U.S. PATENT DOCUMENTS

| | | | |
|---|---|---|---|
| 2010/0274539 A1* | 10/2010 | Virkar | G06N 20/10 |
| | | | 703/2 |
| 2019/0188197 A1 | 6/2019 | Stolte et al. | |
| 2021/0241074 A1* | 8/2021 | Mayer | G06N 3/08 |
| 2022/0108195 A1* | 4/2022 | Kehler | G06N 3/047 |
| 2024/0211457 A1* | 6/2024 | Maeno | G06F 16/23 |

OTHER PUBLICATIONS

Varshney, K. R. and A. S. Willsky, "Linear Dimensionality Reduction for Margin-Based Classification: High-Dimensional Data and Sensor Networks," IEEE Transactions on Signal Processing, vol. 59, No. 6, Jun. 2011, pp. 2496-2512.

* cited by examiner

COMPUTER-IMPLEMENTED DATA PROCESSING METHOD, AND MEASUREMENT SYSTEM

FIELD OF THE DISCLOSURE

Embodiments of the present disclosure generally relate to a computer-implemented data processing method. Embodiments of the present disclosure further relate to a measurement system.

BACKGROUND

Dimensionality reduction techniques for reducing the dimensionality of a data set are well-known in the state of the art. In general, these techniques are used in order to reduce the number of dimensions, i.e. the number of properties of each data point of the data set. This way, redundant information is removed from the data set, which facilitates a transfer and further processing of the data due to the reduced size of the data set having reduced dimensionality.

The data points of the data set having reduced dimensionality have a reduced number of properties or a reduced number of latent coordinates that relate to the so-called latent space.

In general, the properties of the data points in the latent space are difficult to interpret for an operator as the latent coordinates are fundamentally different from the original properties of the data points.

Thus, there is a need for a computer-implemented data processing method and a measurement system that facilitate the interpretation of data in the latent space.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a computer-implemented data processing method. In an embodiment, the computer-implemented data processing method comprises the steps of: capturing and/or receiving a data set, wherein the data set comprises a plurality of data points; reducing a dimensionality of the data set, thereby obtaining an adapted data set having a reduced dimensionality, wherein the adapted data set comprises adapted data points, wherein the adapted data points have a predetermined number of latent coordinates, respectively, and wherein the latent coordinates are associated with a latent space; partitioning the latent space into a plurality of latent subspaces; determining at least one representative parameter for the plurality of latent subspaces, respectively, wherein the at least one representative parameter comprises additional information on the adapted data points located in the respective latent subspace; and generating joint visualization data based on the adapted data set and based on the representative parameters determined.

The computer-implemented data processing method according to embodiments of the present disclosure is based on the idea to determine and visualize additional information about local properties of the adapted data set, namely the representative parameters for the latent subspaces.

For example, the at least one representative parameter may comprise an average of at least one property of the data points associated with the respective lateral subspace, a maximum of at least one property of the data points associated with the respective lateral subspace, a minimum of at least one property of the data points associated with the respective lateral subspace, an average of at least one property of the adapted data points associated with the respective lateral subspace, a maximum of at least one property of the adapted data points associated with the respective lateral subspace, and/or a minimum of at least one property of the adapted data points associated with the respective lateral subspace.

It is also conceivable that the adapted data set is processed, e.g. by a measurement application, thereby generating a processed data set comprising a plurality of processed data points.

Accordingly, the at least one representative parameter may comprise an average of at least one property of the processed data points associated with the respective lateral subspace, a maximum of at least one property of the processed data points associated with the respective lateral subspace, and/or a minimum of at least one property of the data points associated with the respective lateral subspace.

However, it is to be understood that the at least one representative parameter may comprise any other suitable information that facilitates an interpretation of the adapted data set, for example a number of adapted data points in the respective latent subspace and/or a number of anomalous adapted data points in the respective latent subspace.

In an embodiment, the at least one representative parameter may be determined for each of the latent subspaces, respectively.

In general, the generated joint visualization data may be displayed on a display. For example, the joint visualization data may be displayed on a display of a measurement instrument and/or on a monitor being connected to a computing device, such as a personal computer. Thus, the additional information on the adapted data points is visualized together with the adapted data points, such that the additional information is presented to a user in an illustrative way.

In an embodiment, the joint visualization data corresponds to a simultaneous visualization of the adapted data set and of the at least one representative parameter for the latent subspaces, such that a link between the location in the latent space and the additional information (i.e. the at least one representative parameter) is provided.

Accordingly, the computer-implemented data processing method according to embodiments of the present disclosure assists the user in the interpretation of the adapted data set in the latent space, as the additional information is visualized together with the adapted data points.

It is noted that the type of the data set is arbitrary. In general, the data set may be n-dimensional, i.e. each data point of the data set may have n coordinates or n properties, wherein n is an integer greater than or equal to 2. It is to be understood that n may be greater than or equal to 5, 10, 50, 100, 500, or even larger.

In an embodiment, the adapted data set may be m-dimensional, wherein m is an integer being smaller than n. In an embodiment, m may be equal to 1, 2, or 3.

According to an aspect of the present disclosure, the latent space, for example, is partitioned according to a predefined pattern. In general, an arbitrary suitable pattern may be used. For example, the latent space may be partitioned such that the latent subspaces all have the same size and/or shape.

However, it is also conceivable that the latent subspace is partitioned such that the different latent subspaces may have different sizes and/or different shapes. It has turned out that an enhanced compression (described in more detail below) of the data set can be obtained by allowing for arbitrary sizes of the latent subspaces.

In an embodiment, the predefined pattern is at least one of a triangular pattern, a quadrangular pattern, a rectangular pattern, a square pattern, or a honeycomb pattern. In general, these patterns allow to partition a two-dimensional latent space such that all latent subspaces have the same size and shape, as these patterns allow for a tessellation of the latent space. In other words, these patterns "tile the plane" defined by the two-dimensional latent space.

If the latent space has a dimension greater than two, higher-dimensional equivalents of these patterns may be used in order to partition the latent space.

In an embodiment of the present disclosure, sizes of the latent subspaces and/or shapes of the latent subspaces are determined, for example, based on the adapted data points and/or based on the data points. In other words, the sizes and/or shapes of the latent subspaces may be different from each other depending on properties of the adapted data points and/or depending on properties of the data points associated with the adapted data points.

According to an aspect of the present disclosure, the sizes of the latent subspaces and/or the shapes of the latent subspaces are determined, for example, based on a local density of the adapted data points and/or based on local average values of the adapted data points.

For example, sizes of the latent subspaces may be smaller in regions of the latent space having a higher density of adapted data points. In other words, more latent subspaces may be assigned to regions of the latent space having a higher density of adapted data points. Thus, it is ensured that the at least one representative parameter is provided with a higher resolution in regions of the latent space having a higher density of adapted data points than in regions of the latent space having a lower density of adapted data points.

In an embodiment of the present disclosure, the sizes of the latent subspaces and/or the shapes of the latent subspaces are determined, for example, based on at least one property of the data points associated with the adapted data points, for example based on local average values of the at least one property.

For example, at least one criterion may be applied to the data points associated with the adapted data points in order to determine the sizes and/or shapes of the latent subspaces. In other words, the sizes of the latent subspaces and/or the shapes of the latent subspaces may be determined such that at least a majority of the data points associated with a specific latent subspace fulfill the same criterion, or such that an average over the data points associated with a specific latent subspace fulfills the criterion.

In an embodiment of the present disclosure, the joint visualization data comprises a scatter plot of the adapted data points. The scatter plot may be a two-dimensional scatter plot or a three-dimensional scatter plot.

In an embodiment, the at least one representative parameter may be visualized on or within the scatter plot, for example on or within the respective latent subspaces. Alternatively or additionally, the at least one representative parameter may be visualized by the side of the scatter plot.

According to an aspect of the present disclosure, a data format of the data set, for example, is equal to the data format of the adapted data set. Thus, interpretation of the adapted data set and further processing of the adapted data set are further facilitated.

In an embodiment of the present disclosure, the data points are sequential. In other words, the data points of the data set are ordered in a sequence, for example in a temporal sequence or in a frequency sequence.

According to another aspect of the present disclosure, the data set, for example, is captured by a measurement instrument. Accordingly, the data set is a measurement data set, wherein the data points may correspond to individual measurement points.

For example, the measurement instrument may be an oscilloscope, a digital oscilloscope, a signal analyzer, a vector signal analyzer, a vector network analyzer, or a spectrum analyzer.

In an embodiment, the data set may correspond to eye diagram data, S-parameter data, spectrogram data, frequency response data, time series data, and/or IQ data. However, it is to be understood that the data set may correspond to any other type of measurement data. For example, the data set may comprise any sets of measurement values, log information, text messages, etc.

A further aspect of the present disclosure provides, for example, that the computer-implemented data processing method further comprises the steps of: capturing and/or receiving a second data set, wherein the second data set comprises a plurality of data points; reducing the dimensionality of the second data set, thereby obtaining a second adapted data set having reduced dimensionality; and allocating at least one latent subspace of the plurality of latent subspaces to the second data set based on the second adapted data set.

Therein and in the following, the term "allocating at least one latent subspace" is understood to denote that the latent subspaces comprising the adapted data points of the second adapted data set are determined. Allocating the at least one latent subspace of the plurality of latent subspaces to the second data set is useful for a plurality of reasons.

Similarities between different data sets can be detected, as the same latent subspaces are allocated to different data sets being similar to each other. For example, the data set and the second data set may relate to the measurement of at least one property of an electronic device, such as an analog-to-digital converter (ADC) or an antenna.

Based on the latent subspaces allocated to the data sets being associated with different electronic devices, electronic devices having the same or at least similar properties can be determined. This way, the time necessary for performing tests on a plurality of device under test can be reduced significantly.

For example, ADCs having a similar frequency response can be determined and may be used in a measurement instrument in order to optimize interleave alignment metrics. As another example, antennas having the same or at least a similar antenna transceiver pattern may be determined and may be used in an antenna array in order to achieve an enhanced beam-forming characteristic.

In an embodiment, the computer-implemented data processing method may be used in order to compress the second data set.

In an embodiment, at least one identification parameter associated with the at least one latent subspace allocated to the second data set may be determined. The second data set may be further processed based on the at least one identification parameter. Thus, the amount of data that is to be transmitted is reduced significantly, as only the at least one identification parameter has to be transmitted instead of the second data set or the second adapted data set.

In an embodiment, at least one identification parameter associated with the at least one latent subspace allocated to the second data set is determined, wherein the second data set is visualized based on the at least one identification parameter. Thus, the time necessary for visualizing the second data set is reduced significantly, as the rendering of visualization data associated with the second data set is performed based on the at least one identification parameter, i.e. based on data of significantly reduced size compared to the second data set.

In an embodiment, the second data set may be visualized only based on the at least one identification parameter. For example, the at least one identification parameter may comprise a unique number or a unique set of numbers assigned to the respective latent subspace, e.g. coordinates or indices of the respective latent subspace. Alternatively or additionally, the at least one identification parameter may comprise the at least one representative parameter associated with the respective latent subspace.

Embodiments of the present disclosure further provide a measurement system. In an embodiment, the measurement system comprises a measurement instrument and at least one data processing circuit. The measurement system is configured to perform any one of, or all of, the computer-implemented data processing method(s) described above. In an embodiment, the measurement system may be configured to perform the computer-implemented data processing method according to any one of the embodiments described above.

In an embodiment, the measurement instrument is configured to capture the data set.

In an embodiment, the at least one data processing circuit may be configured to reduce the dimensionality of the data set.

In an embodiment, the at least one data processing circuit may be configured to partition the latent space into the plurality of latent subspaces.

In an embodiment, the at least one data processing circuit may be configured to determine the at least one representative parameter for the plurality of latent subspaces, respectively.

In an embodiment, the at least one data processing circuit may be configured to generate the joint visualization data based on the adapted data set and based on the representative parameters determined.

Regarding the further advantages and properties of the measurement system, reference is made to the explanations given above with respect to the computer-implemented data processing method, which also holds for the measurement system and vice versa.

According to an aspect of the present disclosure, the at least one data processing circuit, for example, is integrated into the measurement instrument and/or into an external computer device. For example, the measurement instrument may be an oscilloscope, a digital oscilloscope, a signal analyzer, a vector signal analyzer, a vector network analyzer, or a spectrum analyzer. The external computer device may be a personal computer, a laptop, a MAC, a smartphone, a tablet, a server, or any other suitable type of smart device.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
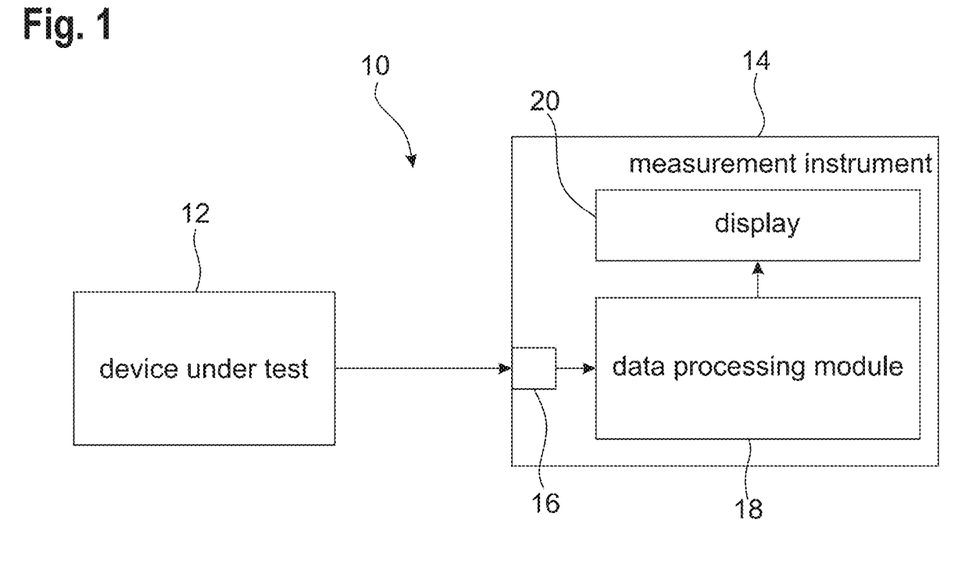
FIG. 1 schematically shows a measurement system according to an embodiment of the present disclosure.

FIG. 1 schematically shows a representative measurement system 10. In the embodiment shown, the system 10 comprises a device under test 12 and a measurement instrument 14. In general, the device under test 12 may be an arbitrary type of electronic device to be tested by the measurement instrument 14. For example, the device under test 12 may be an analog-to-digital converter (ADC), an amplifier, an attenuator, a filter, an antenna, etc. On the other hand, the measurement instrument 14 may be an oscilloscope, a digital oscilloscope, a signal analyzer, a vector signal analyzer, a vector network analyzer, a spectrum analyzer, or any other suitable type of measurement instrument.

In the embodiment of FIG. 1, the measurement instrument 14 comprises a signal input 16, a data processing circuit 18, and a display 20. The signal input 16 is configured to receive a test signal from the device under test 12, and to forward the received test signal to the data processing circuit 18. The test signal may be an output signal of the device under test 12. Alternatively, the test signal may be a signal reflected at a port of the device under test 12.

In general, the data processing circuit 18 is configured to (e.g., programmed to) process the test signal, thereby obtaining measurement data associated with the device under test 12. The data processing circuit 18 may further be configured to (e.g., programmed to) generate visualization data associated with the measurement data, wherein the visualization data may be displayed by the display 20.

It is noted that while the display 20 is shown to be integrated into the measurement instrument 14 in FIG. 1, it is also conceivable that the measurement system 10 comprises an external display being connected with the data processing circuit 18 via a corresponding port of the measurement instrument 14.

Figure 2:
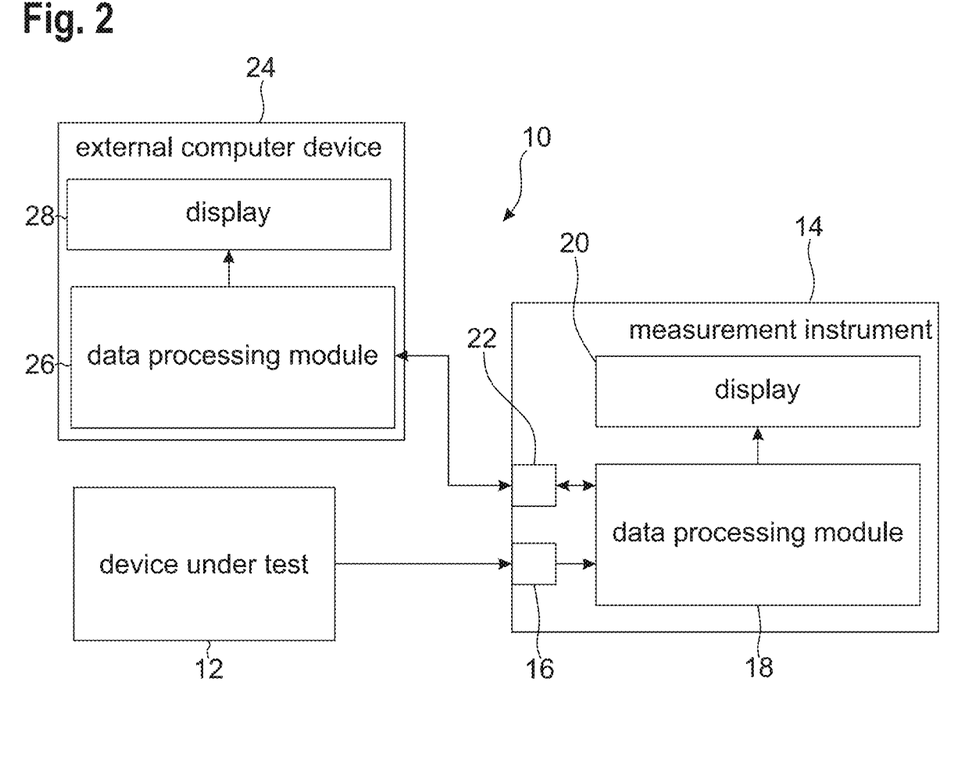
FIG. 2 schematically shows a measurement system according to another embodiment of the present disclosure.

FIG. 2 shows another embodiment of the measurement system 10, wherein only the differences compared to the embodiment of FIG. 1 are explained in the following. In the embodiment of FIG. 2, the measurement instrument 14 comprises an input/output (I/O) port 22. The measurement instrument 14 is capable of being connected with an external computer device 24 via the I/O port 22.

The external computer device 24 may be, for example, established as a personal computer, a laptop, a MAC, a smartphone, a tablet, a server, or as any other suitable type of smart device. In that regard, the external computer device 24 comprises a data processing circuit 26 that is connected with the data processing circuit 18 of the measurement instrument 14.

In an embodiment, the external computer device 24 may further comprise a display 28 that is connected with the data processing circuit 26 of the external computer device 24. It is noted that while the display 28 is shown to be integrated into the external computer device 24 in FIG. 2, it is also conceivable that the measurement system 10 comprises an external display being connected with the data processing circuit 26 of the external computer device 24 via a corresponding port of the external computer device 24.

The embodiments of the measurement system 10 are configured to perform a computer-implemented data processing method, an example of which is described hereinafter with reference to FIG. 3. Without restriction of generality, the computer-implemented data processing method is described in the context of the measurement system 10 of FIG. 2. However, it is to be understood that the explanations given hereinafter likewise apply to the measurement system 10 of FIG. 1, wherein the data processing circuit 18 of the measurement instrument 14 performs the functionality of both data processing circuits 18, 26 described hereinafter.

Figure 3:
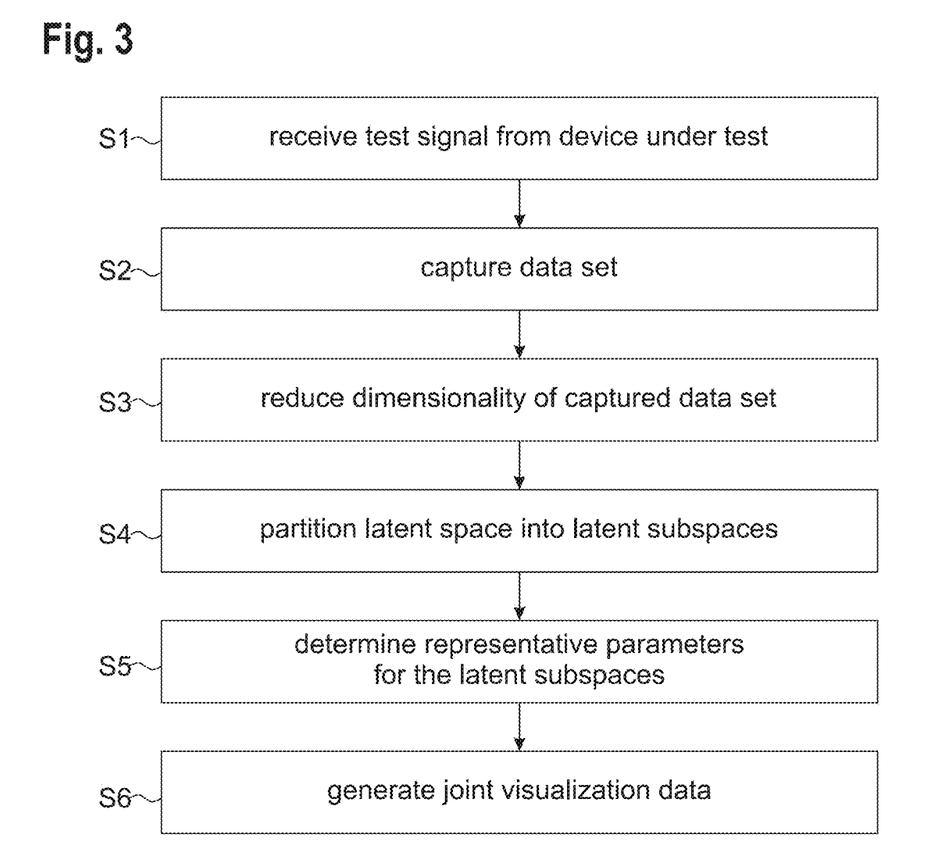
FIG. 3 shows an example flow chart of a computer-implemented data processing method according to an embodiment of the present disclosure.

As shown in FIG. 3, the example method begins with the test signal being received from the device under test 12 and forwarded to the data processing circuit 18 of the measurement instrument 14 (step S1). In general, the test signal may be an arbitrary type of analog or digital signal.

A data set is captured by the data processing circuit 18 of the measurement instrument 14, wherein the data set comprises a plurality of data points (step S2). Accordingly, in this example embodiment, the data set is a measurement data set, wherein the data points correspond to individual measurement points determined based on the test signal received from the device under test 12.

In an embodiment, the data points may be sequential. In other words, the data points of the data set may be ordered in a sequence, for example in a temporal sequence or in a frequency sequence.

For example, the data set may comprise eye diagram data, S-parameter data, spectrogram data, frequency response data, time series data, and/or IQ data. However, it is to be understood that the data set may correspond to any other type of measurement data.

For example, the data set may comprise any sets of measurement values, log information, text messages, etc.

The steps of the computer-implemented data processing method described hereinafter may be performed by the data processing circuit 18 of the measurement instrument 14 and/or by the data processing circuit 26 of the external computer device 24.

Without restriction of generality, it is assumed hereinafter that the captured data set is transmitted to the data processing circuit 26 of the external computer device 24 and that the steps described hereinafter are performed by the data processing circuit 26 of the external computer device 24.

A dimensionality of the data set is reduced by the data processing circuit 26, thereby obtaining an adapted data set having a reduced dimensionality (step S3). The adapted data set comprises adapted data points, wherein the adapted data points have a predetermined number of latent coordinates, respectively, and wherein the latent coordinates are associated with a latent space.

Therein, any suitable dimensionality reduction technique known in the state of the art may be used. For example, the dimensionality reduction technique may be based on a machine-learning technique or on a conventional deterministic algorithm. In a certain example, an autoencoder or a B-variational autoencoder may be used in order to reduce the dimensionality of the data set.

In general, the number of dimensions of the latent space, i.e. the dimensionality of the latent space, is smaller than the number of dimensions of the data set, i.e. smaller than the dimensionality of the data set. In an embodiment, the data set may be n-dimensional, i.e. each data point of the data set may have n coordinates or n properties, wherein n is an integer greater than or equal to 2. It is to be understood that n may be greater than or equal to 5, 10, 50, 100, 500, or even larger.

The adapted data set may be m-dimensional, wherein m is an integer being smaller than n. Accordingly, the adapted data set may have m latent coordinates, i.e. the dimensionality of the latent space is equal to m. In an embodiment, m may be equal to 1, 2, or 3. However, it is also conceivable that m may be greater than 3.

It is noted that a data format of the data set may be equal to the data format of the adapted data set. However, it is also conceivable that the data formats of the data set and of the adapted data set are different from each other.

Figure 4:
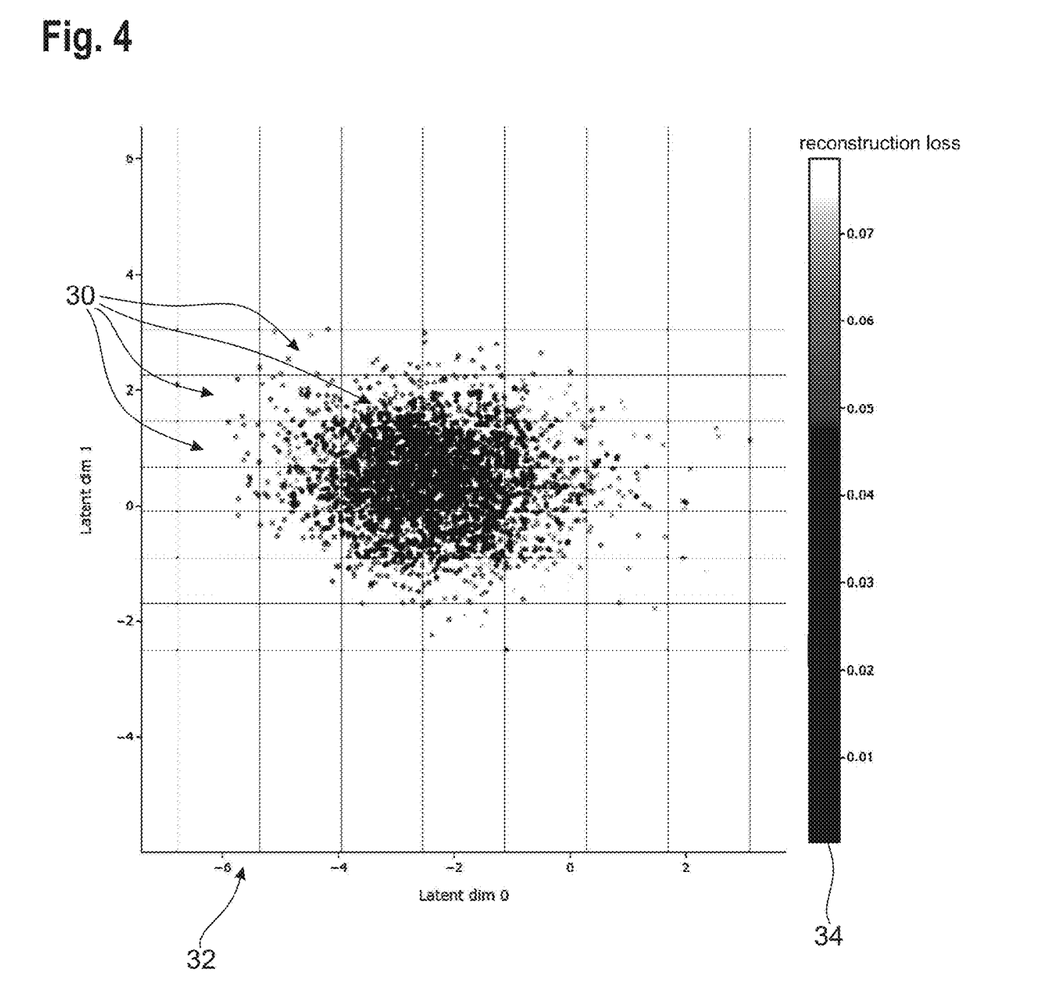
FIG. 4 shows an example of visualization data generated by the computer-implemented data processing method according to an embodiment of the present disclosure.

As is illustrated in FIG. 4, the latent space is partitioned into a plurality of latent subspaces 30 (step S4).

In the example shown in FIG. 4, the latent space is two-dimensional and is partitioned according to a predefined pattern being a rectangular pattern, such that the latent subspaces 30 have equal sizes and shapes. However, it is to be understood that any other suitable pattern may be used in order to partition the latent space, wherein the individual latent subspaces 30 may all have the same size and/or the same shape. For example, the predefined pattern may be a triangular pattern, a quadrangular pattern, a square pattern, or a honeycomb pattern. Alternatively, the individual latent subspaces 30 may have sizes and/or shapes that are pairwise different from each other.

If the dimensionality of the latent space is greater than two, higher-dimensional equivalents of these patterns may be used in order to partition the latent space.

Alternatively or additionally, sizes of the latent subspaces 30 and/or shapes of the latent subspaces 30 may be determined based on the adapted data points and/or based on the data points. In other words, the sizes and/or shapes of the latent subspaces 30 may be different from each other depending on properties of the adapted data points and/or depending on properties of the data points associated with the adapted data points.

Alternatively or additionally, the sizes of the latent subspaces 30 and/or the shapes of the latent subspaces 30 may be determined based on a local density of the adapted data points and/or based on local average values of the adapted data points. For example, more latent subspaces 30 may be assigned to regions of the latent space having a higher density of adapted data points.

Alternatively or additionally, the sizes of the latent subspaces 30 and/or the shapes of the latent subspaces 30 may be determined based on at least one property of the data points associated with the adapted data points, for example based on local average values of the at least one property. For example, at least one criterion may be applied to the data points associated with the adapted data points in order to determine the sizes and/or shapes of the latent subspaces 30. In other words, the sizes of the latent subspaces and/or the shapes of the latent subspaces 30 may be determined such that at least a majority of the data points associated with a specific latent subspace fulfill the same criterion.

In a certain example, the criterion may relate to an average value of at least one property of the data points, which are associated with the adapted data points, being smaller than or greater than a predefined threshold.

In another example, the sizes of the latent subspaces and/or the shapes of the latent subspaces 30 may be determined such that an average over the at least one property of the data points associated with a specific latent subspace fulfills the criterion.

At least one representative parameter is determined by the data processing circuit 26 for the plurality of latent subspaces 30, respectively (step S5). In an embodiment, the at least one representative parameter may be determined for each of the latent subspaces 30, respectively.

In general, the at least one representative parameter comprises additional information on the adapted data points located in the respective latent subspace 30. The additional information may relate to properties of the data points associated with the adapted data points and/or to the adapted data points themselves.

For example, the at least one representative parameter may comprise an average of at least one property of the data points associated with the respective lateral subspace 30, a maximum of at least one property of the data points associated with the respective lateral subspace 30, and/or a minimum of at least one property of the data points associated with the respective lateral subspace 30.

Alternatively or additionally, the at least one representative parameter may comprise an average of at least one property of the adapted data points associated with the respective lateral subspace 30, a maximum of at least one property of the adapted data points associated with the respective lateral subspace 30, and/or a minimum of at least one property of the adapted data points associated with the respective lateral subspace 30.

It is also conceivable that the adapted data set is further processed by a measurement application, for example by a measurement application integrated into the data processing circuit 26, thereby generating a processed data set comprising a plurality of processed data points.

Accordingly, the at least one representative parameter may comprise an average of at least one property of the processed data points associated with the respective lateral subspace 30, a maximum of at least one property of the processed data points associated with the respective lateral subspace 30, and/or a minimum of at least one property of the data points associated with the respective lateral subspace 30.

In the example shown in FIG. 4, the adapted data set may be further processed by the data processing circuit 26, wherein the data processing circuit 26 reconstructs or tries to reconstruct the original data set based on the adapted data set. In other words, the processed data set corresponds to a reconstructed version of the original data set. In the example shown in FIG. 4, the at least one representative parameter comprises a reconstruction loss, i.e. an error between the respective processed data points and the original data points.

Joint visualization data is generated by the processing circuit 26 based on the adapted data set and based on the representative parameters determined (step S6). The joint visualization data may be displayed on the display 20 of the measurement instrument 14 and/or on the display 28 of the external computer device 24.

In general, the joint visualization data corresponds to a simultaneous visualization of the adapted data set and of the representative parameters determined. In the embodiment shown in FIG. 4, the joint visualization data comprises a scatter plot 32 of the adapted data set or of the adapted data points in the latent space defined by the latent coordinates ("Latent dim 0" and "Latent dim 1" in FIG. 4) of the adapted data points.

Further, the joint visualization data may comprise a color-coded representation of the at least one representative parameter, namely a color-coded representation of the reconstruction loss. For example, the joint visualization data comprises a color-coded scale 34 indicating a value of the reconstruction loss, wherein the individual adapted data points are colored according to the associated reconstruction loss.

Figure 5:
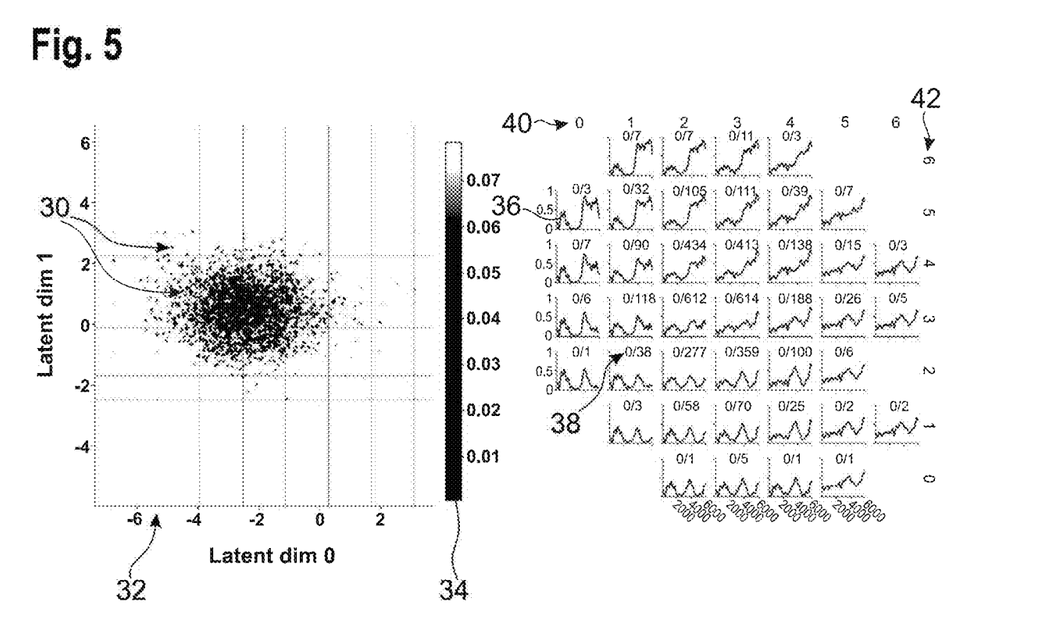
FIG. 5 shows another example of visualization data generated by the computer-implemented data processing method according to an embodiment of the present disclosure.

In the example embodiment shown in FIG. 5, the joint visualization data further comprises an array of representative curves 36. In other words, in this case the at least one representative parameter comprises a representative curve 36 for each of the latent subspaces 30. For example, the representative curves 36 may be an average frequency response associated with the adapted data points comprised in the respective latent subspace 30.

In the example embodiment shown in FIG. 5, the at least one representative parameter further comprises at least one numerical parameter 38 indicating the number of adapted data points in the respective latent subspace 30, and/or a number of adapted data points having anomalous properties in the respective latent subspace 30. For example, the at least one numerical parameter 38 has the form "n_a Vn_T", wherein n_a is the number of anomalous adapted data points in the respective latent subspace 30, and wherein n_T is the total number of adapted data points in the respective latent subspace 30.

In the example embodiment shown in FIG. 5, the visualization data further comprises column indices 40 and row indices 42 indicating the column and the row of the latent subspaces 30, respectively. Accordingly, each latent subspace 30 is uniquely identified by a column index 40 and a row index 42.

Summarizing, the joint visualization data corresponds to a simultaneous visualization of the adapted data set and of the at least one representative parameter for each of the latent subspaces 30. Thus, additional information about local properties of the adapted data set is visualized together with the adapted data set.

Thus, the computer-implemented data processing method(s) described above assists the user in the interpretation of the adapted data set in the latent space, as the additional information is visualized together with the adapted data points. However, the computer-implemented data processing method described above may also be used for selecting devices under test 12 having similar properties and/or for compression of measurement data, as is described hereinafter with reference to FIG. 6.

Figure 6:
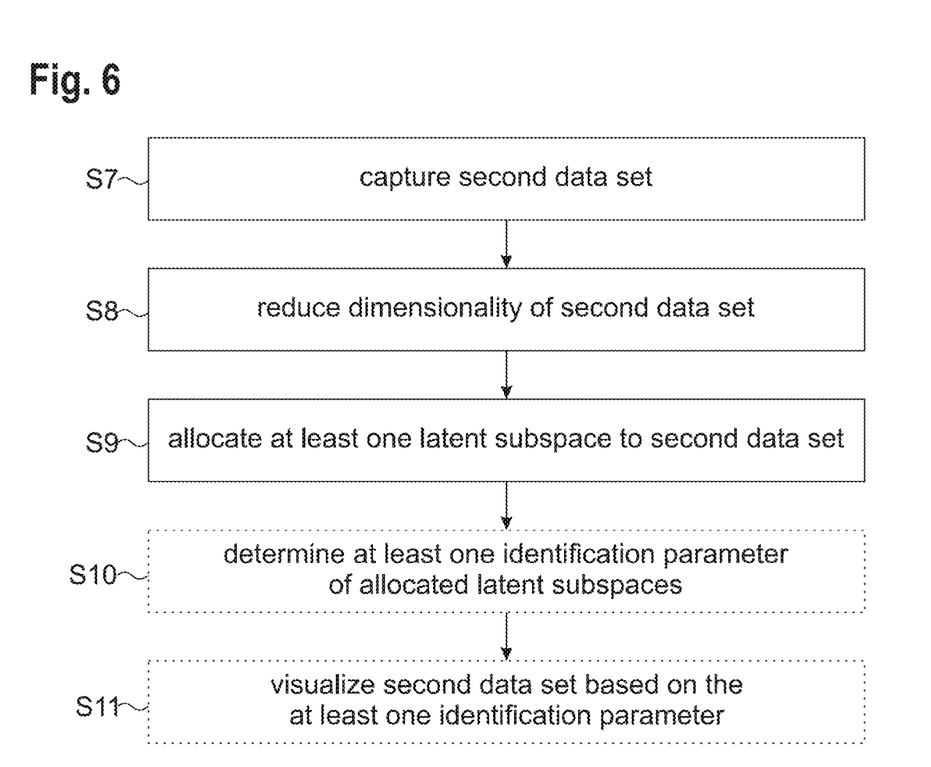
FIG. 6 shows another example flow chart of a computer-implemented data processing method according to another embodiment of the present disclosure.

A second data set may be captured by the measurement instrument 14, for example wherein the second data set comprises a plurality of data points being associated with another device under test, for example with another device under test being of the same type as the device under test 12

(step S7). The dimensionality of the second data set is reduced, thereby obtaining a second adapted data set having reduced dimensionality (step S8). In an embodiment, the dimensionality of the second data set may be reduced analogously to step S3 described above. At least one latent subspace 30 of the plurality of latent subspaces 30 is allocated to the second data set based on the second adapted data set (step S9).

Steps S1 to S9 or steps S7 to S9 described above may be repeated for a plurality of devices under test being identically constructed.

In general, similarities between different data sets can be detected based on the latent subspaces 30 allocated to the different data sets, as the same latent subspaces 30 are allocated to different data sets being similar to each other. Thus, devices under test having similar behavior can be identified based on the latent subspaces 30 allocated to the devices under test.

For example, ADCs having a similar frequency response can be determined and may be used in a measurement instrument in order to optimize interleave alignment metrics. As another example, antennas having the same or at least a similar antenna transceiver pattern may be determined and may be used in an antenna array in order to achieve an enhanced beam-forming characteristic of the antenna array.

In another embodiment, the computer-implemented data processing method described above may be used in order to compress the second data set.

At least one identification parameter associated with the at least one latent subspace 30 allocated to the second data set may be determined (step S10). In general, the at least one identification parameter uniquely identifies the at least one latent subspace 30. For example, the at least one identification parameter may comprise pairs of column indices 40 and row indices 42 of the latent subspaces 30 allocated to the second data set.

If the second data set is to be further processed, e.g. by a measurement application, the at least one identification parameter may be transmitted to the measurement application instead of the second data and/or the second adapted data. Thus, the amount of data that is to be transmitted is reduced significantly, as only the at least one identification parameter has to be transmitted instead of the second data set or the second adapted data set.

As another example, the amount of data necessary for exporting the second data set to another electronic device is reduced significantly, as the at least one identification parameter may be exported instead of the second data and/or the second adapted data.

Further, the second data set may be visualized based on the at least one identification parameter, for example only based on the at least one identification parameter (step S11). For example, the second data set may be visualized on the display 20 of the measurement instrument 14 and/or on the display 28 of the external computer device 24.

In general, a certain combination of latent subspaces 30 allocated to the second data set may uniquely correspond to a certain type of visualization of the second data set. For example, a certain combination of latent subspaces 30 allocated to the second data set may uniquely correspond to a certain shape of the frequency response of a device under test.

Conversely, the second data set may be (at least preliminarily) visualized based on the latent subspaces 30 allocated to the second data set. For example, the data processing circuit 26 may comprise a lookup table comprising curve shapes associated with the latent subspaces 30.

Thus, the second data set may be visualized based on the at least one identification parameter and based on the lookup table.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In an embodiment, the data processing circuit 18 and/or the data processing circuit 26 is programmed to carry out one or more steps of any of the methods disclosed herein. In some embodiments, one or more computer-readable media associated with or accessible by the data processing circuit 18 and/or the data processing circuit 26 contains computer readable instructions embodied thereon that, when executed by the data processing circuit 18 and/or the data processing circuit 26, cause the data processing circuit 18 and/or the data processing circuit 26 to perform one or more steps of any of the methods disclosed herein.

According to some embodiments, many individual steps of a process may or may not be carried out utilizing computer or computing based systems described herein, and the degree of computer implementation may vary, as may be desirable and/or beneficial for one or more particular applications.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A computer-implemented data processing method, the computer-implemented data processing method comprising:
   capturing, by a measurement instrument, a data set, wherein the data set comprises a plurality of data points, wherein the measurement instrument comprises an oscilloscope, a digital oscilloscope, a signal analyzer, a vector signal analyzer, a vector network analyzer, and/or a spectrum analyzer;
   reducing, by at least one data processing circuit, a dimensionality of the data set, thereby obtaining an adapted data set having a reduced dimensionality, wherein the adapted data set comprises adapted data points, wherein the adapted data points have a predetermined number of latent coordinates, respectively, and wherein the predetermined number of latent coordinates are associated with a latent space;
   partitioning, by the at least one data processing circuit, the latent space into a plurality of latent subspaces;
   determining, by the at least one data processing circuit, at least one representative parameter for each of the plurality of latent subspaces, respectively, wherein the at least one representative parameter comprises additional information on the adapted data points located in the respective latent subspace;
   generating, by the at least one data processing circuit, joint visualization data based on the adapted data set and based on the determined at least one representative parameter; and
   displaying, on a display, the joint visualization data presenting a simultaneous visualization of the adapted data set and of the determined at least one representative parameter for each of the plurality of latent subspaces, such that additional information about local properties of the adapted data set is visualized together with the adapted data set,
   wherein the joint visualization data includes an array of representative curves, and wherein the array of representative curves comprises a representative curve for said each of the plurality of latent subspaces.

2. The computer-implemented data processing method of claim 1, wherein the latent space is partitioned according to a predefined pattern.

3. The computer-implemented data processing method of claim 2, wherein the predefined pattern is at least one of a triangular pattern, a quadrangular pattern, a rectangular pattern, a square pattern, or a honeycomb pattern.

4. The computer-implemented data processing method according to claim 1, wherein sizes of the plurality of latent subspaces and/or shapes of the plurality of latent subspaces are determined based on the adapted data points and/or based on the data points.

5. The computer-implemented data processing method of claim 4, wherein the sizes of the plurality of latent subspaces and/or the shapes of the plurality of latent subspaces are determined based on a local density of the adapted data points and/or based on local average values of the adapted data points.

6. The computer-implemented data processing method of claim 4, wherein the sizes of the plurality of latent subspaces and/or the shapes of the plurality of latent subspaces are determined based on at least one property of the data points associated with the adapted data points.

7. The computer-implemented data processing method of claim 6, wherein the sizes of the plurality of latent subspaces and/or the shapes of the plurality of latent subspaces are determined based on local average values of the at least one property.

8. The computer-implemented data processing method according to claim 1, wherein the joint visualization data comprises a scatter plot of the adapted data points.

9. The computer-implemented data processing method according to claim 1, wherein a data format of the data set is equal to a data format of the adapted data set.

10. The computer-implemented data processing method according to claim 1, wherein the data points are sequential.

11. The computer-implemented data processing method according to claim 1, wherein the data set corresponds to eye diagram data, S-parameter data, spectrogram data, frequency response data, time series data, and/or IQ data.

12. The computer-implemented data processing method according to claim 1, further comprising the steps of:
    capturing and/or receiving a second data set, wherein the second data set comprises a plurality of data points;
    reducing a dimensionality of the second data set, thereby obtaining a second adapted data set having reduced dimensionality; and
    allocating at least one latent subspace of the plurality of latent subspaces to the second data set based on the second adapted data set.

13. The computer-implemented data processing method according to claim 12, wherein at least one identification parameter associated with the at least one latent subspace allocated to the second data set is determined, and wherein the second data set is visualized based on the at least one identification parameter.

14. A measurement system, comprising a measurement instrument and at least one data processing circuit, wherein the measurement system is configured to perform the computer-implemented data processing method according to claim 1.

15. The measurement system of claim 14, wherein the at least one data processing circuit is integrated into the measurement instrument and/or into an external computer device.

\* \* \* \* \*